L. MEHLBERGER.
FERTILIZER DISTRIBUTER AND PLANTER.
APPLICATION FILED OCT. 6, 1916.
1,215,955.
Patented Feb. 13, 1917.
2 SHEETS—SHEET 1.
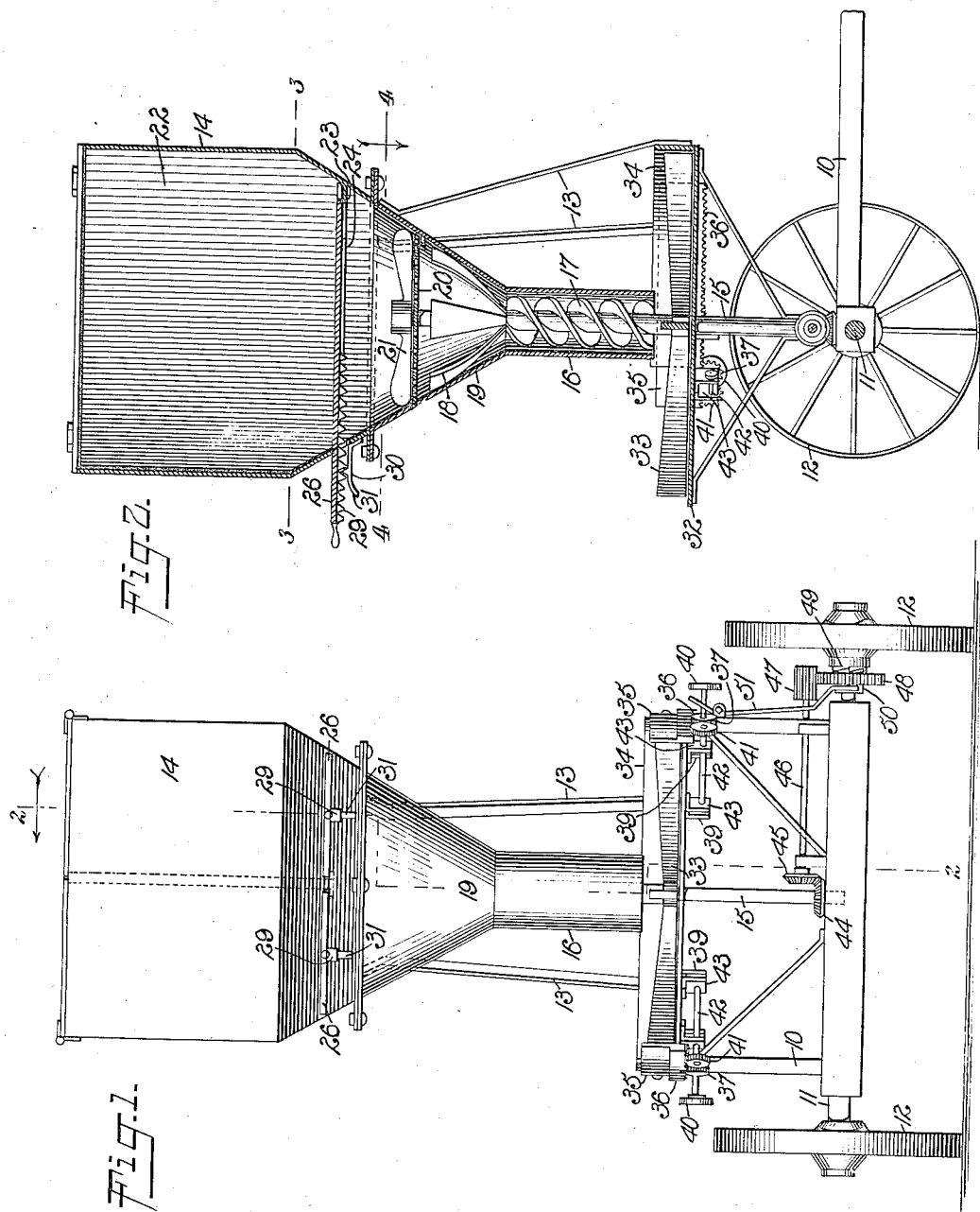
WITNESSES
INVENTOR
Louis Mehlberger
BY
ATTORNEYS

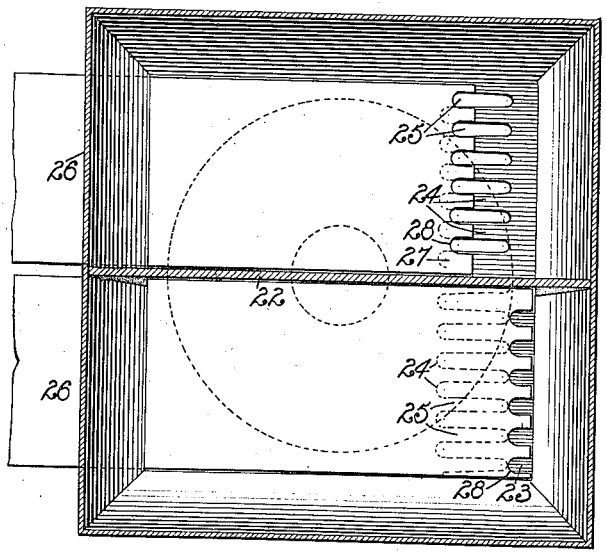
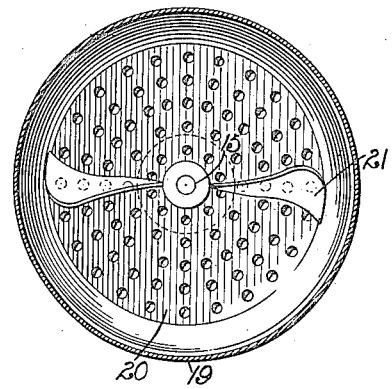
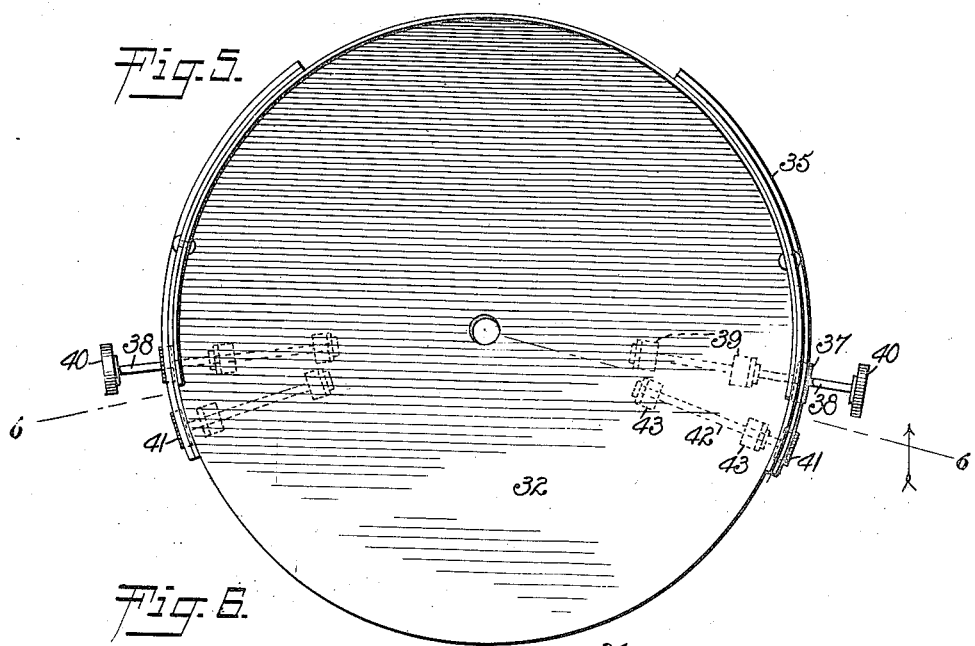

UNITED STATES PATENT OFFICE.

LOUIS MEHLBERGER, OF EASTON, PENNSYLVANIA.

FERTILIZER-DISTRIBUTER AND PLANTER.

1,215,955.  Specification of Letters Patent.  Patented Feb. 13, 1917.

Application filed October 6, 1916. Serial No. 124,033.

*To all whom it may concern:*

Be it known that I, LOUIS MEHLBERGER, a citizen of Germany, and a resident of Easton, in the county of Northampton and State of Pennsylvania, have invented a new and Improved Fertilizer-Distributer and Planter, of which the following is a full, clear, and exact description.

My invention relates to an agricultural machine adapted to be employed as a fertilizer distributer or a planter, or both, and more particularly, the invention relates to the fertilizer distributer forming the subject of United States Letters Patent, No. 1,011,071, granted to me December 5, 1911.

The present invention has more particular reference to the hopper attachments for regulating the discharge of the fertilizer or seed therefrom, and to the table onto which the fertilizer or seed is delivered from the hopper to revoluble distributing means arranged in connection with said table.

The nature of the present invention and its advantages will appear as the description proceeds.

Reference is to be had to the accompanying drawings forming a part of this specification in which similar reference characters indicate corresponding parts in all the views.

Figure 1 is a rear elevation of a machine embodying my invention;

Fig. 2 is a longitudinal vertical section on the line 2—2, Fig. 1;

Fig. 3 is an enlarged horizontal section on the line 3—3, Fig. 2;

Fig. 4 is an enlarged horizontal section on the line 4—4, Fig. 2;

Fig. 5 is an enlarged plan view of the table;

Fig. 6 is a vertical section on the line 6—6, Fig. 5.

In general the machine includes a frame 10 supported on axles, one of which is shown and designated by the numeral 11, the axle having running wheels 12. Mounted on suitable supporting elements 13 is a hopper 14.

A vertical shaft 15, driven in the manner hereinafter described, extends through the contracted cylindrical lower end or discharge spout 16 of the hopper. Within said spout 16 the shaft 15 is provided with a feed screw 17 and on said shaft at the upper end are flaring agitating fingers 18 conforming generally to the conical intermediate portions 19 of the hopper. The parts referred to correspond in general with the similar elements in my patent mentioned above.

Above the fingers 18 there is provided in the conical portion 19 of the hopper, a horizontal screen plate 20 through which the vertical shaft 15 extends. On said shaft above the screen plate 20, agitating blades 21 are provided. The hopper 14 is formed with a vertical partition 22 dividing the hopper into two boxes or compartments for fertilizer or seed, or both. The hopper is provided also at one side, preferably the front, with a transverse bottom member 23 which extends from the adjacent wall toward the center of the hopper, and is formed with parallel fingers 24 and intermediate spaces 25 constituting openings through which the material may escape. A horizontal slide or gate 26 is provided in each compartment of the hopper and is so formed at its front edge as to coöperate with the fingers 24 and their spaces 25. Thus, as best seen in Fig. 3, each slide 26 is formed with fingers 27 and intermediate recesses 28. The fingers 27 overlie the fingers 24 and the recesses 28 are adapted to be brought into register with the spaces 25 as shown at the upper portion of Fig. 3, thereby presenting oblong openings through which the material may escape. Obviously, the slide 26 may thus be made to control the size of the outlet openings or to cut off the said openings in one or the other of the compartments in the hopper. Each slide 26 has suitable means to hold it in adjusted position, there being shown for the purpose, (see Fig. 2) a rack 29 on the slide in engagement with a spring dog 30 having a finger piece 31.

The agitating blades 21 are thus disposed between the screen plate 20 and the bottom of the hopper represented by the partition member 23 and slides 26.

The feed screw 17 discharges the material onto a round table 32 above which is a revoluble distributing or scattering element 33 presenting a series of radial arms.

The table 32 is formed with a vertical flange 34 extending about the edge of the table for something more than half the circumference thereof, the flange serving as a guard to present discharge of material at the front and confine the discharge to the unflanged rear portion of the table.

In order to provide adjustable means to vary the extent of the area over which the material will be scattered by the distributing device 33, auxiliary arcuate flanges 35 are provided, one at each side of the table, and slidable relatively to the fixed flange 34 whereby said auxiliary flanges may be projected more or less beyond the ends of the fixed flange.

Each flange 35 is formed with a rack 36 at the under side, meshing with which is a pinion 37 on a transverse shaft 38 mounted to turn in suitable bearings 39 on the under side of the table 32, the shaft being provided with a knurled head 40 or like expedient for turning the shaft. It will be seen with the turning of the shaft 38 in either direction the pinion 37 will move the adjustable flange member 35. The projected end of the auxiliary guard flange 35 is supported on an idler roller 41 which preferably is toothed to be engaged by the rack 36. The idler 41 is secured to a shaft 42 turning in suitable bearings 43 on the table.

To drive the shaft 15, the same has a fixed bevel pinion 44 meshing with a pinion 45 on a horizontal shaft 46, the outer end of which has a broad pinion 47 meshing with a toothed wheel 48 keyed on the axle 11 to slide thereon. The pinion 47 may be controlled by a clutch, there being a fixed clutch element 49 on the adjacent running wheel 12, and a mating clutch member 50 on the gear wheel 48, the latter clutch member being controlled by a clutch lever 51.

The described construction affords a practical means for carrying my invention into effect, and I would state in conclusion that I do not limit myself strictly to the mechanical details herein illustrated, since manifestly the same can be considerably varied without departure from the spirit of the invention, as defined in the appended claims.

Having thus described my invention I claim as new, and desire to secure by Letters Patent:

1. A machine of the class described including a hopper, a vertical shaft extending into the hopper, means to turn said shaft, a screen plate in the hopper, an agitating device turning with the shaft above the said screen plate, and means in the hopper above the said agitating device to regulate the discharge of material to the screen plate.

2. In a machine of the class described, a hopper, a table below the hopper adapted to receive material from the latter, a revoluble distributing device above the table, a fixed guard flange extending partially about the table outside of the distributing device, and auxiliary guard flanges slidable relatively to the fixed flange at the ends thereof and movable to project beyond the ends of said fixed flange.

3. In a machine of the class described, a hopper, a table below the hopper adapted to receive material from the latter, a revoluble distributing device above the table, a fixed guard flange extending partially about the table, and auxiliary guard flanges slidable relatively to the fixed flange at the ends thereof and movable to project beyond the ends of the fixed flange; together with means for moving said auxiliary guard flanges, said means consisting of racks on the auxiliary flanges, pinions engaging the racks, and means to turn the pinions.

4. In a machine of the class described, a hopper, a table below the hopper adapted to receive material from the latter, a revoluble distributing device above the table, a fixed guard flange extending partially about the table, and auxiliary guard flanges slidable relatively to the fixed flange at the ends thereof and movable to project beyond the ends of the fixed flange; together with means to move said auxiliary flanges to project the same beyond the ends of the fixed flange, and idlers positioned to support the projected ends of the said auxiliary flanges.

LOUIS MEHLBERGER.